(12) United States Patent
Choi et al.

(10) Patent No.: US 7,782,008 B2
(45) Date of Patent: Aug. 24, 2010

(54) MOTOR AND METHOD FOR CONTROLLING OPERATION OF MOTOR

(75) Inventors: Jae-Hak Choi, Seoul (KR); Sung-Ho Lee, Seoul (KR); Jin-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 11/866,920

(22) Filed: Oct. 3, 2007

(65) Prior Publication Data

US 2008/0278108 A1    Nov. 13, 2008

(30) Foreign Application Priority Data

May 10, 2007    (KR) ...................... 10-2007-0045698

(51) Int. Cl.
*H02P 29/00* (2006.01)

(52) U.S. Cl. ...................... 318/788; 318/471; 318/783; 318/791

(58) Field of Classification Search .................. 318/788, 318/471, 781, 783, 785, 791, 792
See application file for complete search history.

(56) References Cited

U.S. PATENT DOCUMENTS

| | | | |
|---|---|---|---|
| 5,212,436 A * | 5/1993 | Nacewicz et al. ........... | 318/788 |
| 5,898,289 A | 4/1999 | Hamatani | |
| 6,356,047 B1 * | 3/2002 | Cecconi ...................... | 318/791 |
| 7,061,204 B2 | 6/2006 | Unno | |
| 7,071,650 B2 * | 7/2006 | Ilda .............................. | 318/785 |
| 2005/0017670 A1 * | 1/2005 | Han et al. .................... | 318/781 |
| 2005/0231151 A1 * | 10/2005 | Ilda .............................. | 318/785 |
| 2006/0163956 A1 * | 7/2006 | Sahashi et al. ............ | 310/68 C |

* cited by examiner

*Primary Examiner*—Bentsu Ro
*Assistant Examiner*—Thai Dinh
(74) *Attorney, Agent, or Firm*—KED & Associates LLP

(57) ABSTRACT

A self-magnetizing motor incorporates a control circuit that starts the motor, controls a magnetizing unit, and then operates the motor. The control circuit can include relay, such as a bi-directional conductive power semiconductor device, and one or more PTC (Positive Temperature Coefficient) switches. This control circuit eliminates the need for a separate controller and the implementation costs can be reduced.

20 Claims, 3 Drawing Sheets

MOTOR AND METHOD FOR CONTROLLING OPERATION OF MOTOR

BACKGROUND

1. Field

The present disclosure relates to a motor which can be used in an appliance and its operation control method. More specifically, the disclosure relates to a self magnetizing motor, and a method of controlling and operating such a motor.

2. Background

In general, an induction motor is operated based on the principle that when a current flows in a wire within a magnetic field, power is generated from the wire according to Flemming's left-hand rule. In case where a rotation magnetic field is formed, and an induction current is generated in conductive bars installed within a rotor according to an electromagnetic induction law (Faraday's Law), the conductive bar receives a particular type of force according to the Flemming's left-hand rule and such force is converted into a rotary force.

In the case of an induction motor, when a rotational speed of the rotor reaches a synchronous speed, which is the rotational speed of the rotation magnetic field, an induction current is no longer generated from the conductive bars installed within the rotor. Thus, as the rotational speed of the rotor approaches the rotational speed of the rotation magnetic field, the rotational force exerted upon the rotor gradually decreases. However, in a typical induction motor, the rotational speed of the rotor never reaches the "synchronous" speed of the rotation magnetic field.

The rotational speed of the magnetic field is given by the equation rpm=(120) (frequency)/number of poles. Thus, when an AC current of 60 Hz (i.e., a typical AC frequency) is applied to a 2-pole induction motor, the synchronous speed is 3,600 rpm. However, in case of a typical induction motor, the actual rotational speed of the rotor is about 3000 rpm, which is smaller than 3,600 rpm. The difference between the synchronous speed and the actual speed is typically referred to as "slip." In addition the rotor rotating at a lower speed, the slip represents an efficiency loss.

BRIEF DESCRIPTION OF THE DRAWINGS

The embodiments will be described in detail with reference to the following drawings, in which like reference numerals refer to like elements, and wherein.

DETAILED DESCRIPTION

As explained above, in a typical induction motor, the rotor cannot rotate at the same speed as the rotation magnetic field. This rotational speed difference, called slip, represents an inefficiency of the typical induction motor. To obtain motors with a higher rotational speed, and less slip, one can use a self-magnetizing motor. A self-magnetizing motor has a layer of magnetic material formed on an exterior surface of the rotor. The self-magnetizing motor is operated as a typical induction motor until the speed of the rotor approaches the synchronous speed of the rotation magnetic field. At that point in time, the magnetic material is excited so that the magnetic material acts like a plurality of magnets attached to the exterior of the rotor. The forces generated by the stator then act upon the magnetic material, and the rotor can speed up to the synchronous speed.

The self-magnetizing motor includes a magnetizing unit which is used to magnetize the magnetic material on the exterior of the rotor when the rotor speed approaches the synchronous speed. The magnetizing unit typically must be operated by a separate controller which monitors the speed of the rotor, and which acts to apply an A/C signal to the magnetizing unit for a very brief period of time to magnetize the magnetic material. When a self-magnetizing motor is used in an appliance, such as a refrigerator, the separate controller needs to be provided externally in order to control the magnetizing unit. Thus, in fabricating an appliance having the self-magnetizing motor, the fabrication cost and the complexity of the appliance increases.

The present application discloses a self-magnetizing motor and its control method which are capable of reducing implementation costs. The disclosed motors include a control circuit that operates to start the motor, control the magnetizing unit and then operate the motor using a bi-directional conductive power semiconductor device, or a relay, and two PTC (Positive Temperature Coefficient) switches. This type of control circuit, which can be built into the motor, eliminates the need for a separate controller.

A self-magnetizing motor as disclosed herein can be used in many typical household appliances. One such application would be for running the compressor of a refrigerator/freezer. Of course, the motor and control circuit could also be used in may other applications. The following description relates to an embodiment where the motor us used in a sealed compressor for a refrigerator/freezer.

Figure 1:
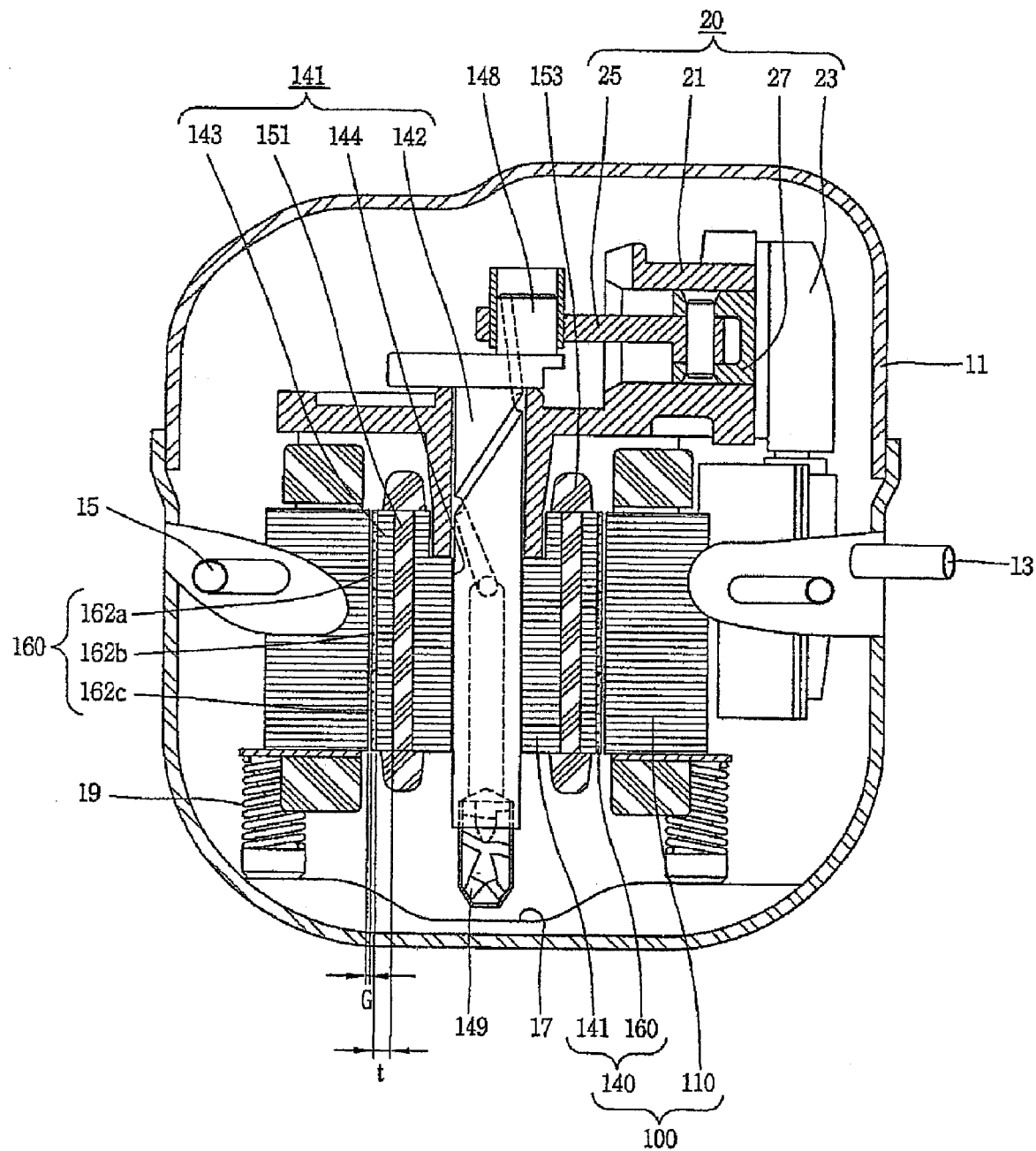
FIG. 1 is a cross-sectional view of a compressor incorporating an induction motor.

FIG. 1 is a cross-sectional view of a compressor which includes a self-magnetizing motor. The upper portion of the diagram shows the compression unit 20 which includes a cylinder 21 and a piston 27. The piston 27 is connected to a connecting rod 25 which is in turn connected to an eccentric portion 148 of the rotating shaft of the motor. As the motor rotates, the piston 27 reciprocates back and forth within the cylinder 21. A refrigerant is drawn into an input line 15, is compressed by the compression unit 20 and is then output through a discharge line 13.

The motor is located underneath the compression unit and includes a stator 110, a rotor 140, and a rotating shaft mounted inside the rotor 140. A plurality of conductive bars 151 are mounted inside the rotor core 141 of the rotor 140. A magnetic layer 160 is formed on the exterior cylindrical surface of the rotor 140. The magnetic layer 160 may actually be comprised of three or more separate sections 162A, 162B, 162C which are stacked in the axial direction along the length of the cylindrical rotor 140.

During the initial startup of the motor 100, the rotation electrical field will generate an induction current in the conductive bars 151. This induction current helps to rotate the rotor. As a rotational speed of the rotor 140 approaches the synchronous speed of the rotation magnetic field, the rotational force generated by the induction current within the conductive bars 151 will gradually decrease. As this point in time, a magnetizing unit will be activated for a short period of time to magnetize the magnetic layer 160 on the exterior of the rotor 140. The rotation magnetic field generated by the stator 110 will then act upon the magnetized magnetic layer 160 to further speed up rotation of the rotor 140.

Figure 2:
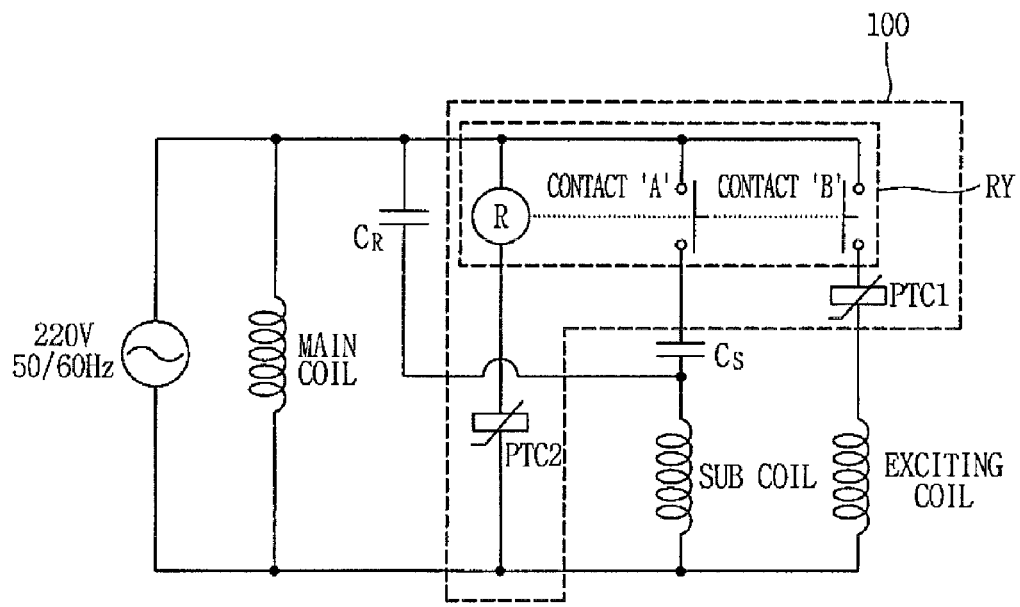
FIG. 2 is a circuit diagram showing a control circuit for a motor as shown in FIG. 1.

FIG. 2 is a circuit diagram showing a control circuit for controlling an operation of a self-magnetizing motor like the one shown in FIG. 1. As shown in FIG. 2, the motor and control circuit includes a main coil, a sub-coil used to start the motor rotating, a starting capacitor Cs, an operation capacitor Cr, and an excitation unit 100.

The starting capacitor Cs applies a current with a fast phase to the sub-coil to start rotation of the rotor. The rotor is initially caused to rotate by a magnetic field generated from the sub-coil. The main coil receives a current having a phase that is slower by approximately 90° than the current applied to the starting coil through the starting capacitor Cs. A rotation magnetic field is generated by the stator due to the current flowing in the main coil. As a result, the rotor is rotated continuously upon application of an alternating current receiving power.

The excitation unit is designed to control the application of power to the sub-coil during the initial startup of the motor. In addition, the excitation unit 100 applies a strong current to the exciting coil of the magnetizing unit for a short period of time to cause the magnetic material to become magnetized. The excitation unit 100 includes a relay RY having contacts 'A' and 'B' that cut off or conduct power supplied to the sub-coil and the exciting coil. A first PTC switch (PTC1) applies power to the exciting coil for the short period of time required to magnetize the magnetic material on the exterior of the rotor. When no power is applied to the relay RY, the B contacts are closed, and the A contacts are open. A second PTC switch (PTC2) applies power to the relay for a predetermined period of time to cause A contacts to be closed, and the B contacts to be opened, for that predetermined period of time. A detailed description of how the circuit operates is provided below.

When power is first applied to the control circuit, power is applied to the second PCT switch PTC2. The power applied to the second PCT switch causes the relay RY to close the A contacts so that power is applied to the sub-coil through the startup capacitor Cs. The PTC switch is configured to operate for a certain predetermined period of time, and to then turn off. When power applied to the PTC switch, the power causes an element within the switch to begin to heat up. When the element reaches a certain predetermined temperature, the switch will then go into an open condition and no longer transmit current therethrough. The PTC switches can be configured to conduct current for certain predetermined periods of time so that the current will only be carried through the switch for a certain period of time.

In the control circuit shown in FIG. 2, the second PTC switch is configured so that current will be applied to the relay to keep the A contacts closed for an amount of time necessary to begin rotation of the rotor of the motor. The sub-coil acts to begin the rotor rotating. Once rotation has reached a speed approaching the synchronous speed, the second PTC switch will heat up sufficiently so that current no longer flows through the switch. At that point in time, because power is no longer being applied to the relay RY, the relay will open the A contacts and close the B contacts. Thereafter, power will be applied to the sub-coil via the running capacitor Cr.

When the B contacts close, current will be applied to the exciting coil of the magnetizing unit. The first PTC switch PTC1 is configured to conduct current for a very short period of time. As a result, the electrical element within this first PTC switch will heat up quickly and current will only be conducted to the exciting coil for a short period of time. This period of time is sufficient, however, to magnetize the magnetic material formed on the exterior of the rotor of the motor. Once the first PTC switch goes into the open condition, power is no longer applied to the exciting coil and the magnetizing unit is switched off. The motor will then continue to rotate due to the power being applied to the main coil. As described above, the magnetic fields generated by the stator will then act upon the magnetic material on the exterior of the rotor to increase the rotational speed of the rotor up to the synchronous speed.

Figure 3:
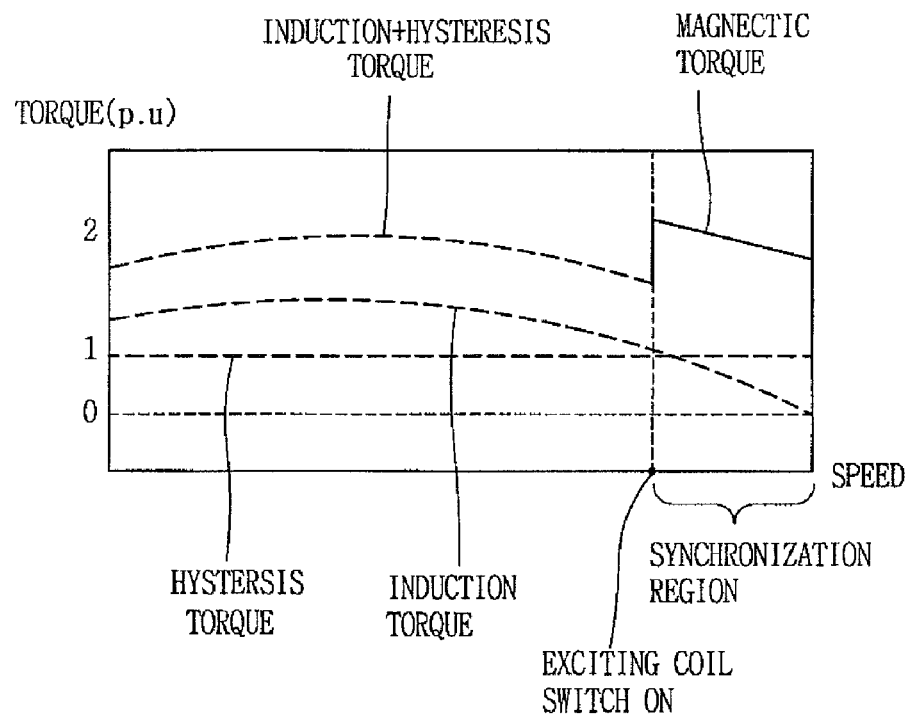
FIG. 3 is a graph of a speed-torque curve of the motor controlled by the circuit shown in FIG. 2.

FIG. 3 illustrates the magnetic torque applied to the rotor as the motor startup procedures are conducted. The rotor is made of a ferromagnetic material. The magnetic field generated by the main coil generates a hysteresis torque (H) that tends to rotate the rotor. As also described above, the current inducted in the metal bars in the rotor also generate an induction torque. But the induction torque falls off as the rotor speed approaches the synchronous speed. During initial startup, the rotor experiences the combination of both the hysteresis and induction torques. And, as shown in the drawing, this combined force begins to decline as the rotor speeds up.

Once the rotor speed approaches the synchronous speed, the second PTC switch is triggered, which in turn triggers the relay to open the A contacts and close the B contacts. As a result, a strong current is applied to the exciting coil, and a strong magnetic flux generated by the exciting coil is transferred to a magnetic material surrounding an outer circumferential surface of the rotor, thereby magnetizing the magnetic material. Essentially, the magnetic material is magnetized to become like a permanent magnet, which is rotated by the rotation magnetic field which has been already generated from the stator.

As shown in FIG. 3, the magnetized magnetic material results in an increase in the torque applied to the rotor, which causes the rotor to speed up to the synchronous speed. Although the rotational speed of the rotor gradually increases to become the same as the synchronous speed of the rotation magnetic field, because the permanent magnet can be continuously rotated along the rotation magnetic field, the rotary force of the rotor will not be reduced.

The self-magnetizing motor undergoes two rotation processes. First, the motor is rotated by the induction torque (I) and the hysteresis torque (H) at a low speed stage. Then the motor is rotated by the excitation torque (P) by exciting the magnetic material on the rotor with by the exciting coil in order to enter a high speed stage (synchronous speed 3,600 rpm).

Because a strong current needs to be applied through the exciting coil only for the short period of time when the magnetic material is magnetized, a heat loss otherwise generated at the coil when a high current is continuously applied can be eliminated, thus increasing the efficiency of the motor. Typically, the exciting coil is only operated for a period of time required for the rotor to make 1 to 5 rotations. Thus, the first PTC switch PTC1 must be configured to only pass current for this short period of time.

Figure 4:
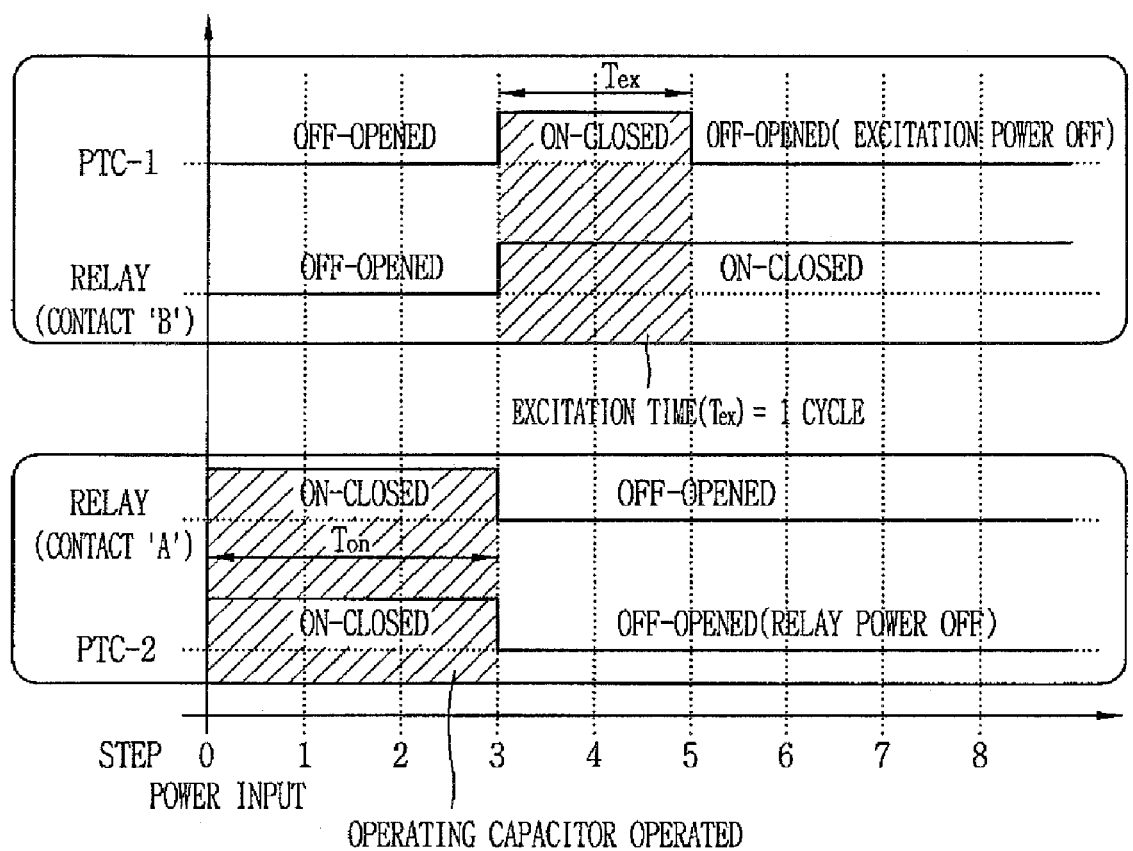
FIG. 4 is an operational timing diagram showing the startup procedure for the motor.

FIG. 4 shows a timing diagram which illustrates how the relay contacts and the PTC switches operate. As shown therein, when power is first applied, the 'A' contacts of the relay RY are closed, and the second PTC switch (PTC2) passes current. Accordingly, power is applied to the sub-coil via the starting capacitor Cs and the 'A' contacts of the relay RY, and accordingly, the rotor begins to rotate.

After a certain period of time elapses (time 3 in FIG. 4), the second PTC switch (PTC2) is turned off, and as a result, the 'A' contacts of the relay RY are opened so that current no longer passes through the 'A' contacts. At the same time, the 'B' contacts of the relay are turned on (closed). Accordingly, current flows through the 'B' contacts of the relay RY and the first PTC switch (PTC1) so that power is applied to the exciting coil. As explained above, the first PTC switch (PTC1) will only conduct current for a short pre-set excitation time Tex.

Once the excitation time Tex elapses, the first PTC switch is turned off, and current is no longer applied to the exciting coil.

The relay RY can be a bi-directional conductive power semiconductor. The excitation input time and the excitation time for supplying power to the exciting coil can be determined by using the relay and the PTCs without using a separate high-priced electronic controller. The motor and the method for controlling the operation of the motor according to the present invention has the advantage that because the self-excitation motor can be started, excited and operated by using a relay and the PCT switches, without using a separate operation control circuit, the fabrication cost of the motor and an appliance incorporating the motor can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various modifications are possible in the component parts and/or arrangements of the subject combinations that would fall within the scope of the disclosure, the drawings and the appended claims. In addition to variations and modifications in the component parts and/or arrangements, alternative uses will also be apparent to those skilled in the art.

What is claimed is:

1. A self-magnetizing motor, comprising:
    a stator having a main coil and a sub-coil;
    a rotor mounted in the stator and having a layer of magnetic material on an exterior surface thereof;
    a magnetizer to selectively magnetize the magnetic material on the rotor; and
    a relay that operates to apply power to the sub-coil for a first predetermined period of time during motor startup, and that also operates to apply power to the magnetizer for a second predetermined period of time, wherein the relay comprises:
    a first set of contacts which are closed during the first predetermined period of time such that power is applied to the sub-coil through the first set of contacts during the first predetermined period of time; and
    a second set of contacts which are closed during the second predetermined period of time such that power is applied to the magnetizer through the second set of contacts during the second predetermined period of time.

2. The motor of claim 1, wherein the relay is configured such that when the first set of contacts are closed, the second set of contacts are open, and such that when the second set of contacts are closed, the first set of contacts are open.

3. The motor of claim 1, further comprising:
    a sub-coil switch that applies power to the relay when power is first applied to the motor to cause the relay to close the first set of contacts, and wherein the sub-coil switch cuts power to the relay after the first predetermined period of time elapses to cause the relay to open the first set of contacts and close the second set of contacts.

4. The motor of claim 3, wherein the sub-coil switch is a Positive Temperature Coefficient switch.

5. The motor of claim 3, further comprising:
    a switch that applies power from the second set of contacts of the relay to the magnetizer for the second predetermined period of time.

6. The motor of claim 5, wherein the switch comprises a Positive Temperature Coefficient switch that cuts power from the second set of contacts to the magnetizer after the second predetermined period of time elapses.

7. The motor of claim 1, further comprising:
    a switch that applies power from the second set of contacts of the relay to the magnetizer for the second predetermined period of time.

8. The motor of claim 7, wherein the switch comprises a Positive Temperature Coefficient switch that cuts power from the second set of contacts to the magnetizer after the second predetermined period of time elapses.

9. A self-magnetizing motor that includes a stator, a rotor and a magnetizer, comprising:
    a starter to start the motor by applying power to a sub-coil of the motor for a first predetermined period of time after power is first applied to the motor to help the rotor to start rotating; and
    means for magnetizing an exterior surface of the rotor by applying power to the magnetizer of the motor for a second predetermined period of time after the first predetermined period of time elapses.

10. The motor of claim 9, wherein the magnetizing means includes a control circuit.

11. The motor of claim 10, wherein the control circuit includes a switch.

12. A method for controlling an operation of a self-magnetizing motor that includes a stator, a rotor and a magnetizer, comprising:
    starting the motor by applying power to a sub-coil of the motor for a first predetermined period of time after power is first applied to the motor to help the rotor to start rotating; and
    magnetizing an exterior surface of the rotor by applying power to the magnetizer of the motor for a second predetermined period of time after the first predetermined period of time elapses.

13. The method of claim 12, wherein starting the motor comprises controlling the application of power to the sub-coil using a sub-coil switch.

14. The method of claim 13, wherein starting the motor further comprises applying power to a relay, using the sub-coil switch, for the first predetermined period of time to cause the relay to apply power to the sub-coil through a first set of contacts of the relay that are closed when the sub-coil switch applies power to the relay.

15. The method of claim 14, wherein magnetizing the exterior surface of the rotor comprises controlling the application of power to the magnetizer using a switch.

16. The method of claim 15, wherein magnetizing the exterior surface of the rotor further comprises: applying power to the switch using a second set of contacts of the relay, wherein the second set of contacts are closed by the relay when the sub-coil switch cuts power to the relay.

17. The method of claim 16, wherein magnetizing the exterior surface of the rotor further comprises cutting power to the magnetizer with the switch after the second predetermined period of time elapses.

18. The method of claim 12, wherein magnetizing the exterior surface of the rotor comprises controlling the application of power to the magnetizer using a switch.

19. The method of claim 18, wherein magnetizing the exterior surface of the rotor further comprises applying power to the switch using a relay which applies power to the switch after starting the motor has been completed.

20. The method of claim 19, wherein magnetizing the exterior surface of the rotor further comprises cutting power to the magnetizer with the switch after the second predetermined period of time elapses.

* * * * *